United States Patent
Kim et al.

[11] Patent Number: 6,067,234
[45] Date of Patent: May 23, 2000

[54] ADAPTOR CONNECTION APPARATUS FOR A DATA PROCESSING SYSTEM

[75] Inventors: Roy Moonseuk Kim; Sanjay Gupta, both of Austin, Tex.

[73] Assignee: International Business Machines Corporation, Armonk, N.Y.

[21] Appl. No.: 08/995,551

[22] Filed: Dec. 22, 1997

[51] Int. Cl.⁷ ..................................... H05K 1/14
[52] U.S. Cl. .................. 361/737; 361/735; 361/742; 361/790; 361/804; 257/679
[58] Field of Search .................... 361/684, 686, 361/730, 735, 736, 737, 742, 785, 790, 803, 804; 439/44, 74, 541.5, 638, 639, 928.1, 945, 946, 955; 235/380, 441, 491, 492; 257/679; 902/26

[56] References Cited

U.S. PATENT DOCUMENTS

| | | | |
|---|---|---|---|
| 3,736,471 | 5/1973 | Donze et al. | 361/684 |
| 5,257,165 | 10/1993 | Chiang | 361/737 |
| 5,296,692 | 3/1994 | Shino | 235/492 |
| 5,375,037 | 12/1994 | Le Roux | 361/737 |
| 5,408,386 | 4/1995 | Ringer et al. | 361/737 |
| 5,575,686 | 11/1996 | Noschese | 439/74 |
| 5,637,001 | 6/1997 | Nony et al. | 439/928.1 |
| 5,677,830 | 10/1997 | Nogas et al. | 361/735 |
| 5,679,007 | 10/1997 | Potdevin et al. | 439/945 |
| 5,713,747 | 2/1998 | Hsia et al. | 439/541.5 |
| 5,763,862 | 6/1998 | Jachimowicz et al. | 235/380 |

*Primary Examiner*—Leo P. Picard
*Assistant Examiner*—John B. Vigushin
*Attorney, Agent, or Firm*—Casimer K. Salys; Jack V. Musgrove; Andrew J. Dillon

[57] ABSTRACT

An apparatus and method, for use with a data processing system having an architecture, which provide for the possibility of smart card use without unduly impacting the data processing system's architecture. An enclosure, having at least one PC card acceptor and at least one smart card acceptor, is created. A suspension mechanism is operably connected to enclosure in a fashion such that suspension mechanism is capable of physically connecting enclosure to a motherboard such that enclosure is suspended above a component of motherboard. The method and system give rise to several advantages. One advantage is that board space is saved in that the enclosure is suspended over existing board components. A second advantage is that the method and system allow original equipment manufactures to make the provision of smart card usage optional, in that smart card usage can be provided by a simple add-on to lower-end systems. A third advantage is the cost savings which comes from having integral PC card-smart card acceptors. A fourth advantage is that the method and system can be adapted to many configurations, such as providing alternate numbers of PC card and smart card acceptors, arranged in many different physical relationships. Those skilled in the art will recognize many other advantages in addition to those listed here.

18 Claims, 5 Drawing Sheets

ADAPTOR CONNECTION APPARATUS FOR A DATA PROCESSING SYSTEM

BACKGROUND OF THE INVENTION

1. Technical Field

In general, the present invention relates to a method and apparatus for use with a data processing system. Specifically, the present invention relates to a method and apparatus for use with a data processing system having a physical architecture. Yet still more specifically, the present invention relates to a method and apparatus for use with a data processing system having a physical architecture, and which provide for the possibility of smart card use without unduly impacting the data processing system's physical architecture.

2. Description of the Related Art

Data processing systems, are typically composed of a system unit including a random access memory (RAM), a read only store (ROS), a central processing unit (CPU), a display adaptor for connecting a display device to the system unit, a pointing device adaptor for connecting a pointing device such as a mouse, tablet, touch screen or the like to the system unit, a keyboard adaptor for connecting a keyboard to the system unit, and a mass storage device such as a hard disk drive or tape streamer for example, all interconnected by a system bus. In addition, the system unit typically includes but is not limited to one or more similar input/output (I/O) ports linked to the system bus for connecting additional adaptors to the system bus to enhance the performance of computer system. For example, a communication adaptor may be plugged into one of the I/O ports to permit connection of the computer system to other computer systems in a network such as, for example, a token ring network.

In some conventional computer systems, the I/O ports are provided inside the system unit in the form of edge connectors linked to the system bus. However, this arrangement is inconvenient because the covers of the computer system have to be removed in order to plug in a new adaptor.

More recently, there have become available optional adaptors, known generally as PC cards, which have been designed in accordance with some industry standard. One such standard is the PCMCIA standard. Examples of well-known PCMCIA adaptors include additional mass storage cards and communication adaptor cards. Typically, a PCMCIA adaptor is encapsulated in a sealed rectangular container. Each PCMCIA adaptor occupies approximately the same space as a credit card. However, there are 3 Types of PCMCIA adaptor each characterized by a different thickness: Type I adaptors are typically 3 mm thick; Type II adaptors are approximately 5 mm thick; and Type III are approximately 12 mm thick. A connector specified by the PCMCIA standard is provided along one end of the container. The connector is a universal 68 pin connector common to all PCMCIA adaptors. In use, the end of the container carrying the connector is plugged into a slot-like socket specified by the PCMCIA standard in the housing of the computer system. The connector on the adaptor mates with a reciprocal connector at the end of the socket. The reciprocal connector in the socket is linked to the system bus via a PCMCIA expansion bus in the computer system. There are three types of sockets, each corresponding in size to a different one of the three types of adaptor. A typical Type III socket includes a shell defining an approximately 12 mm thick slot for receiving a Type III PCMCIA adaptor, such as a mass storage device for example. Alternatively, two Type II reciprocal connectors are stacked one above the other at the end of the slot. The socket there not only accommodates one Type III adaptor, but also a similar or mixed pair of Type I and Type II adaptors.

Another, newer, PC card standard is known as "Card Bus." "Card Bus" is a 32 bit standard that operates at a higher frequency (up to about 33 MHz) than PCMCIA, which has essentially the same physical dimensions as were described for PCMCIA.

It has become increasingly common in the data processing systems industries to off-load many repetitive and/or specialized tasks previously performed by the central processing unit in conjunction with one or more other components onto dedicated circuit boards with built-in logic or firmware that gives it some kind of independent decision-making capability. Within certain (e.g., banking, finance, education, entertainment, etc.) industries, such circuit boards with built-in logic or firmware are encapsulated within credit cards and are generally referred to as "smart cards."

Such "smart cards" appear similar to the common credit card, except that the "smart card" typically has eight gold connectors which allow contact and communication with the smart card's internal logic and firmware. In practice, smart cards are used like a credit card. A specific example of such use would be where a smart card is used to control access to satellite-based entertainment. The smart card records the number of transactions, such as number of movies watched, and then deactivates when the smart card user has reached his transaction quota. Thus, the smart card allows the monitoring to be encapsulated and done by the card, rather than requiring monitoring by some central station.

If smart cards are to be used with data processing equipment, such data processing equipment must provide smart card acceptors. When a data processing system is built, it is often not known what type of repetitive and/or specialized functions the end users of the system will engage in. Consequently, from a design standpoint, it does not make sense to reserve essential space on the motherboard for potential "smart card" acceptors, especially since in many cases such reserved "smart card" acceptor space would never be utilized. Consequently, at present, whenever use of "smart cards" is called for by an end user, the installation of "smart card" acceptor devices typically poses a large problem, and often requires significant after-market engineering to find space for such "smart cards" on a motherboard of an existing computer architecture. This occurs because, the use of "smart cards" typically (although not always) occurs as an "add on" to the original system as designed.

In addition, because "smart cards" are often an "add on" to the original system, a problem often arises as to how to physically accept "smart card" acceptor devices into the architecture of the system. As is well understood in the art, it is advantageous to have such "smart cards" as physically near the central processing unit as possible, preferably on the mother board itself. However, as is also equally well understood in the art, very little, if any, space is generally available on a motherboard. This is especially true in notebook and sub-notebook computers, where space internal to the computer is already a very critical issue.

Thus, it is apparent that need exists for a method and apparatus which will provide for the eventuality of later "smart card" additions to existing computer architectures in a way which does not unduly consume any more space on a motherboard than that consumed by typically existing computer architecture components.

SUMMARY OF THE INVENTION

It is therefore one object of the present invention to provide a method and apparatus for use with a data processing system.

It is therefore another object of the present invention to provide a method and apparatus for use with a data processing system having a physical architecture.

It is yet still another object of the present invention to provide a method and apparatus for use with a data processing system having a physical architecture, which provide for the possibility of smart card use without unduly impacting the data processing system's physical architecture.

The method and apparatus achieve their objects as follows. Provided are an apparatus and method, for use with a data processing system having an architecture, which provide for the possibility of smart card use without unduly impacting the data processing system's architecture. The apparatus and system accomplish their objects as follows. An enclosure, having at least one PC card acceptor and at least one smart card acceptor, is created. A suspension mechanism is operably connected to enclosure in a fashion such that suspension mechanism is capable of physically connecting enclosure to a motherboard such that enclosure is suspended above a component of motherboard.

The method and system give rise to several advantages. One advantage is that board space is saved in that the enclosure is suspended over existing board components. A second advantage is that the method and system allow original equipment manufactures to make the provision of smart card usage optional, in that smart card usage can be provided by a simple add-on to lower-end systems. A third advantage is the cost savings which comes from having integral PC card-smart card acceptors. A fourth advantage is that the method and system can be adapted to many configurations, such as providing alternate numbers of PC card and smart card acceptors, arranged in many different physical relationships. Those skilled in the art will recognize many other advantages in addition to those listed here.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
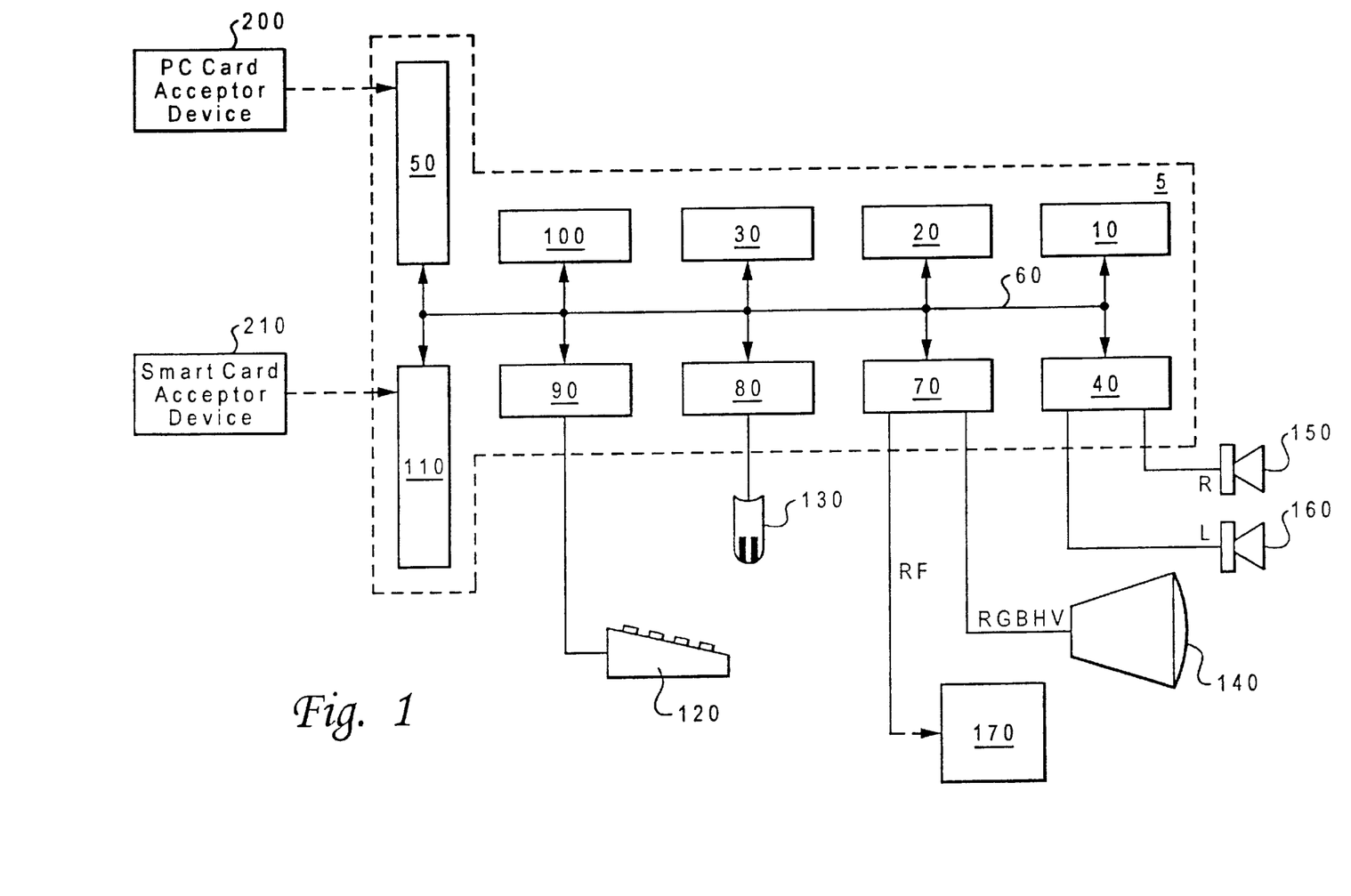
FIG. 1 is a block diagram showing a computer system.

Refer now to FIG. 1. FIG. 1 is a block diagram showing a computer system including but not limited to a system unit 5 including a random access memory (REM) 10, a read only store (ROS) 20, a central processing unit (CPU) 30 such as a microprocessor, for example, an audio adaptor 40, a display adaptor 70, a pointing device adaptor 80, a keyboard adaptor 90, a PC card interface 50, and a mass storage device 100 such as a hard disk drive or tape streamer for example, all interconnected by a system bus 60. A "smart card" interface 110 is connected to system bus 60. System unit 5 is connectable via keyboard adaptor 90 to a keyboard 120. A pointing device 130 such as a touch screen, a tablet, or a mouse can be connected to system unit 5 via pointing device adaptor 80. System unit 5 is also connectable via display adaptor 70 to a visual display unit 140 such as a cathode ray tube (CRT) display or a liquid crystal display for example. System unit 5 is further connectable via display adaptor 70 to a television receiver 170, video tape recorder or the like.

At least one PC card adaptor 200 can be connected to system unit 5 via PC card interface 50. PC card adaptor 200 may be an additional hard disk drive or a communication adaptor such as for example a token ring adaptor for linking system unit 5 to other computer systems to form a computer network. Alternatively, PC card adaptor 200 may be a modem for linking system unit 5 to a telephone network. Similarly, at least one smart card 210 can be connected to system unit 5 via smart card interface 110. Smart card acceptor device 210 is a device having logic and physical contacts appropriate to accepting smart cards containing built-in logic or firmware that gives the smart card some kind of independent decision-making capability. In one embodiment, smart card acceptor device 210 is a rectangular receptacle that occupies approximately the same plan view space as a credit card, or approximately the same plan view space as PC card adaptor 200.

In operation, CPU 30 processes data stored in a combination of RAM 10 and mass storage device 100 under the control of computer program code stored in a combination of ROS 20, RAM 10, and mass storage device 100. Keyboard and mouse adaptors 90 and 80 permit data and instructions to be manually entered into system unit from keyboard 120 and mouse 130 respectively. Audio adaptor 40 translates output data from system unit 5 into stereo audio signals L and R for driving a pair of loudspeakers 150 and 160. Display adaptor 70 translates output data from system unit 5 into video signals, R, G and B, and horizontal and vertical picture synchronization (sync) signals, H and V, for configuring display 140 to generate a visual data output. In addition, display adaptor 70 can translate output data from system unit 5 generate a television signal RF for driving reception by, for example, a television receiver 170 or a video tape recorder. System bus 60 includes core logic (not shown) which may be hard-wired logic or a combination of hard-wired logic and computer program code for coordinating data transfer between RAM 10, ROS 20, CPU 30, storage device 100, PC card interface 50, smart card interface 110, adaptors 40, 90, 80 and 70, 200, and 210, and also serial and parallel printer ports (not shown).

Figure 2:
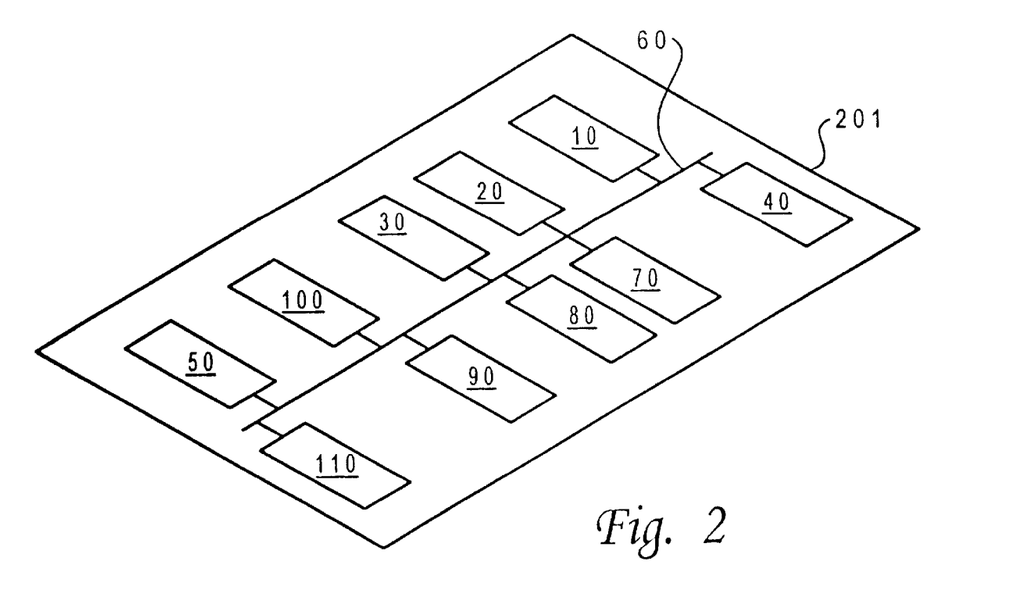
FIG. 2 is a perspective view of a motherboard which will form an environment wherein one embodiment of the present invention can be practiced.

Refer now to FIG. 2. FIG. 2 is a perspective view of a motherboard 201 wherein system 5, without smart card acceptor device 210, has been implemented, and which will form an environment wherein one embodiment of the present invention can be practiced. As can be seen from FIG. 2, there is very little space available for the addition of smart card circuitry, and but for an embodiment of the present invention such smart card placement would prove to be extremely difficult and require significant engineering effort.

Figure 3A:
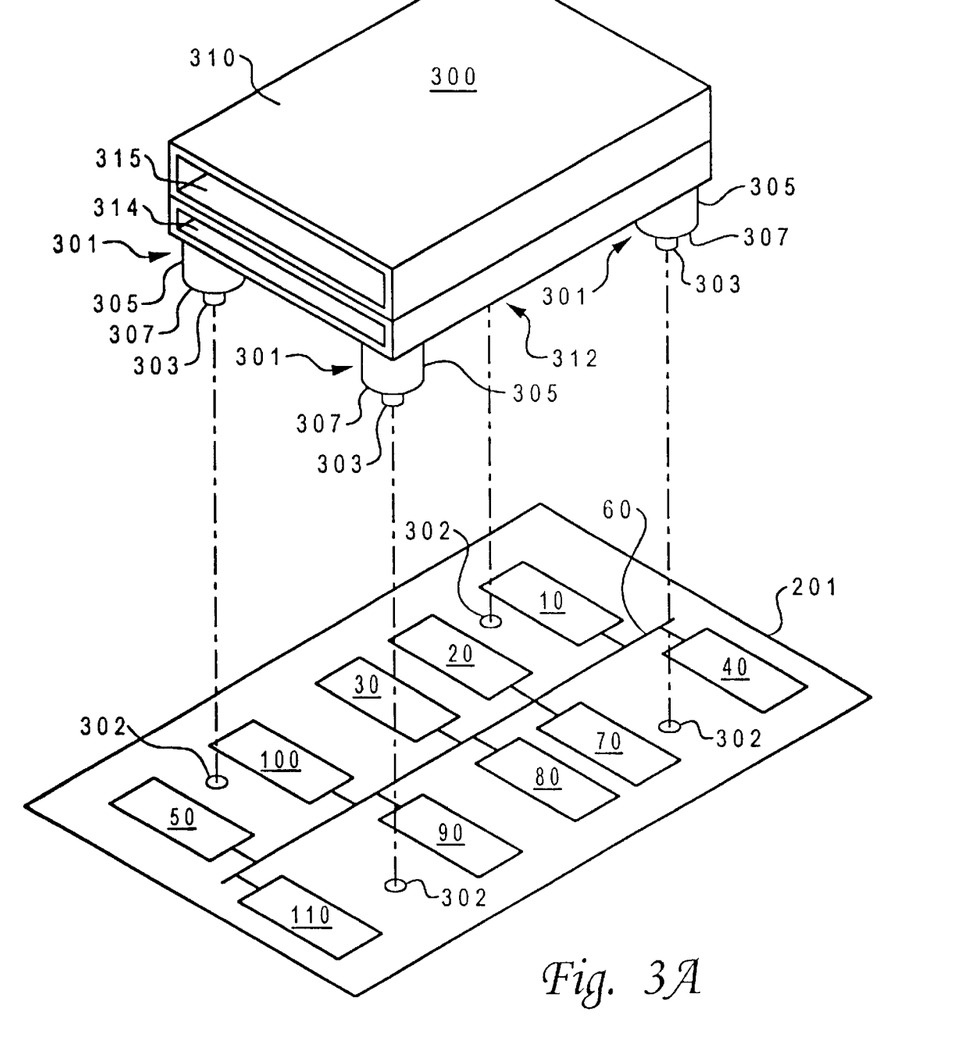
FIG. 3A is an exploded perspective view of one embodiment of a PC card and smart card acceptor device of the present invention being practiced in the environment set forth in FIG. 2.

Refer now to FIG. 3A. FIG. 3A is an exploded perspective view of one embodiment of the invention being practiced in the environment set forth in FIG. 2. Shown is motherboard 201 wherein four (the number four is arbitrary, and could be one, two, three, five, etc., as dictated by the space available on the motherboard as will be understood by those within the art) holes 302 have been fashioned. Shown also is PC card and smart card acceptor device 300 having an upper outer surface 310, a lower outer surface 312, and a smart card acceptor slot opening 314 and a PC card acceptor slot opening 315. (As used herein the terms PC card acceptor slot opening and smart card acceptor slot opening will be understood to mean that such slot openings have the necessary spatial dimensions and electronic components operably accepting PC cards and smart cards into a system; that is, each PC card and smart card acceptor slot opening can be viewed as a PC card acceptor and smart card acceptor, respectively, as those terms are understood by those within the art.) PC card and smart card acceptor device 300 is shown as being box-like in shape with beveled pins 301 affixed to lower outer surface 312 and positioned so as to match positions with holes 302 and fashioned such that the lower portions 303 of beveled pins 301 will fit snugly and securely within holes 302.

Shown is that the upper portions 305 of beveled pins 301 are of circumference such that each lip 307 of upper portions 305 of beveled pins 301 will be larger than holes 302 and fit snugly against motherboard 201 when beveled pins 301 of PC card and smart card acceptor device 300 are inserted into holes 302 on motherboard 201. Upper portions 305 can be of any length sufficient to elevate PC card and smart card acceptor device 300 off motherboard 201 as is desired.

Figure 3B:
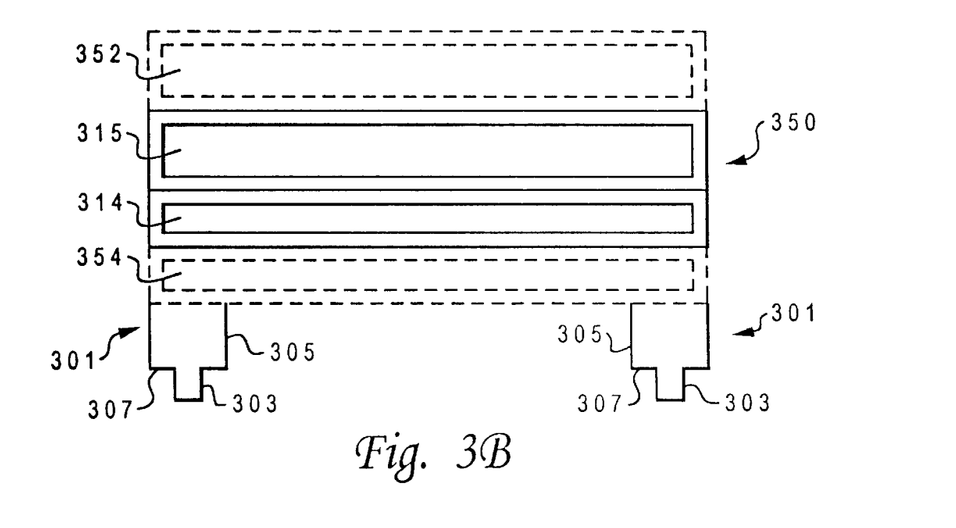
FIG. 3B is a left-side elevational view of the PC card and smart card acceptor device of FIG. 3A illustrating an alternate embodiment wherein slot openings can be stacked.
Figure 3C:
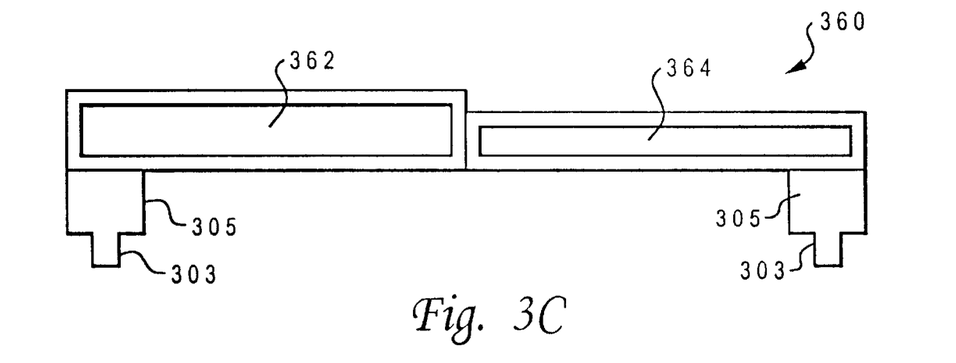
FIG. 3C is a left-side elevational view of the PC card and smart card acceptor device of FIG. 3A which illustrates an additional alternate embodiment wherein slot openings can be placed along the periphery of a PC card and smart card acceptor device.

Refer now to FIGS. 3B and 3C, which show other embodiments also envisioned wherein more than one smart card acceptor slot openings and/or more than one PC card slot openings are provided in PC card and smart card acceptor device. FIG. 3B is a left-side elevational view which depicts that such additional slot openings can be stacked as is illustrated by PC card and smart card acceptor device 350, which is similar to PC card and smart card acceptor device 300, but with optional PC card acceptor slot opening 352 and/or an optional smart card acceptor slot opening 354. The optional components are indicated by dashed line in FIG. 3B.

FIG. 3C is a left-side elevational view which illustrates that additional slot openings can be placed along the periphery of a PC and smart card acceptor device, which is illustrated by PC card and smart card acceptor device 360, which is similar to PC card and smart card acceptor device 300, but with optional PC card acceptor slot openings 362 and optional smart card acceptor slot openings 364 shown along the periphery. Combinations of stacked and peripheral slot openings are also envisioned.

Not shown in FIGS. 3A, 3B, and 3C are electrical connections between the PC card acceptors and the smart card acceptors and their respective interfaces 50 and 110. However, the generation of such connections can be achieved by standard methods well known to those within the art.

Figure 4A:
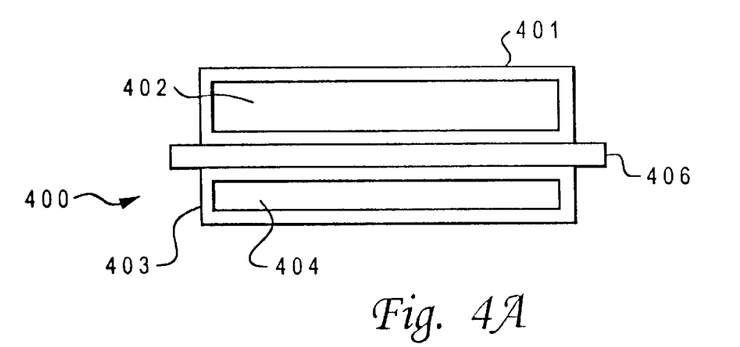
FIG. 4A illustrates a left-side elevational view of an alternate embodiment which utilizes a daughter cards format.
Figure 4B:
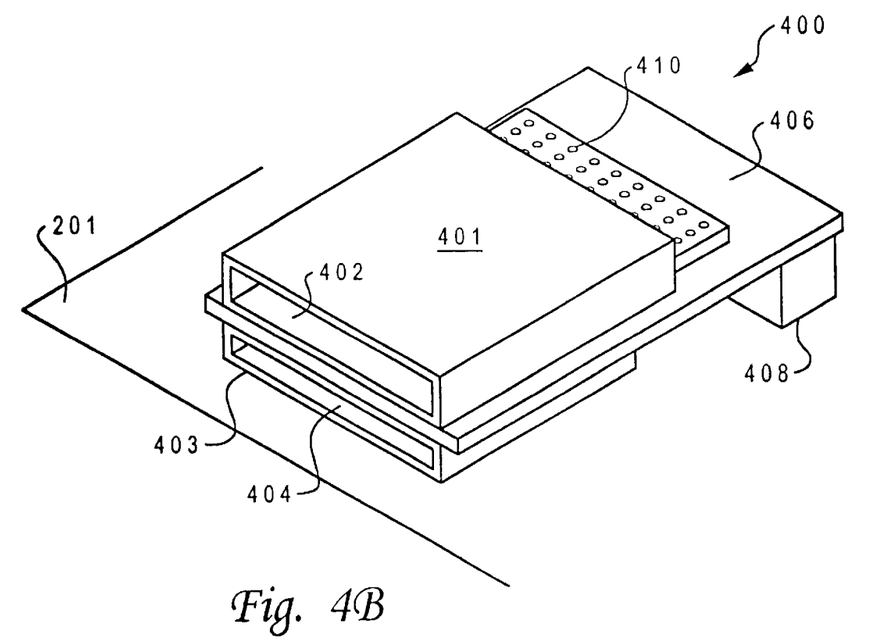
FIG. 4B is a perspective view of the embodiment of FIG. 4A.

Refer now to FIGS. 4A and 4B which show different views of another embodiment which utilizes a daughter card format. Depicted is PC card and smart card acceptor device daughter card 400. In FIG. 4A, shown is that PC card and smart card acceptor device daughter card 400 has PC card acceptor device shell 401, with PC card acceptor slot opening 402, and smart card acceptor device shell 403, with smart card acceptor slot opening 404, of a piece with daughter card 406.

In FIG. 4B shown affixed to daughter card 406 is connector 408, which provides both mechanical connection of daughter card 406 to motherboard 201, and electrical connection between any PC card and/or smart card inserted into PC card acceptor slot opening 402 and/or smart card acceptor slot opening 404. Also shown is connector 410 that connects inserted PC card to daughter card 406, not shown is a similar connector on the underside of daughter card 406 which connects any inserted smart card to daughter card 406. From a physical standpoint, it is to be understood that connector 408 is to be of height sufficient to allow sufficient clearance of smart card acceptor device shell 403 from any components on motherboard 201 which smart card acceptor device shell 403 will overhang.

It is envisioned that PC card and smart card acceptor device daughter card 400 be modified to include more stacked PC card and/or smart card acceptor slot openings in a manner analogous to that demonstrated in relation to FIG. 3B. Likewise, it is also envisioned that PC card and smart card acceptor device daughter card 400 can also be modified to have PC card and/or smart card acceptor slot openings arranged around the periphery in a manner analogous to that demonstrated in relation to FIG. 3C. Lastly, combinations of such stacked and peripheral slot openings are envisioned.

While the invention has been particularly shown and described with reference to a preferred embodiment, it will be understood by those skilled in the art that various changes in form and detail may be made therein without departing from the spirit and scope of the invention.

What is claimed is:

1. An apparatus, for use with a data processing system having an architecture, which provides for the possibility of smart card use without unduly impacting the data processing system's architecture, said apparatus comprising:

an enclosure having at least one PC card acceptor and at least one smart card acceptor, and having at least an upper and a lower side; and a suspension mechanism, operably connected to said enclosure, said suspension mechanism capable of physically connecting said enclosure to a motherboard such that said enclosure is suspended above a component of said motherboard, said suspension mechanism including at least one pin, joined to said lower side, wherein said pin has a larger circumference proximal to said lower side and a smaller circumference distal from said lower side.

2. The apparatus of claim 1, wherein said enclosure having at least one PC card acceptor and at least one smart card acceptor, further comprises at least one PC card acceptor device and at least one smart card acceptor device joined together in a space efficient manner.

3. The apparatus of claim 2, wherein said at least one PC card acceptor device and at least one smart card acceptor device joined together in a space efficient manner further comprises stacking said at least one PC card acceptor device and said at least one smart card acceptor device.

4. The apparatus of claim 2, wherein said at least one PC card acceptor device and at least one smart card acceptor device joined together in a space efficient manner further comprises said at least one PC card acceptor device and said at least one smart card acceptor device joined together in a side-by-side fashion.

5. The apparatus of claim 2, further comprising:
a daughter card having an upper and a lower side;
said at least one PC card acceptor device joined to said upper side of said daughter card; and
said at least one smart card acceptor device joined to said lower side of said daughter card.

6. The apparatus of claim 5, wherein said suspension mechanism further comprises a connector, joined to said lower side of said daughter card, said connector being of height sufficient to clear components on said motherboard.

7. A method, for use with a data processing system having an architecture, which provides for the possibility of smart card use without unduly impacting the data processing system's architecture, said method comprising the steps of:
creating an enclosure, having at least one PC card acceptor and at least one smart card acceptor; and
operably connecting a suspension mechanism to said enclosure in a fashion such that said suspension mechanism is capable of physically connecting said enclosure to a motherboard such that said enclosure is suspended above a component of said motherboard, said connecting step including the steps of designating an upper and a lower side of said created enclosure, and joining to said lower side at least one pin having a larger circumference proximal to said lower side and a smaller circumference distal from said lower side.

8. The method of claim 7, wherein said step of creating an enclosure having at least one PC card acceptor and at least one smart card acceptor further comprises the step of joining together, in a space efficient manner, at least one PC card acceptor device and at least one smart card acceptor device.

9. The method of claim 8, wherein said step of joining together, in a space efficient manner, at least one PC card acceptor device and at least one smart card acceptor device further comprises the step of stacking said at least one PC card acceptor device and said at least one smart card acceptor device.

10. The method of claim 8, wherein said step of joining together, in a space efficient manner, at least one PC card acceptor device and at least one smart card acceptor device further comprises the step of joining said at least one PC card acceptor device and said at least one smart card acceptor device together in a side-by-side fashion.

11. The method of claim 8, further comprising:
selecting a daughter card having an upper and a lower side;
joining said at least one PC card acceptor device to said upper side of said selected daughter card; and
joining said at least one smart card acceptor device to said lower side of said selected daughter card.

12. The method of claim 11, wherein said step of operably connecting said suspension mechanism further comprises the step of joining a connector of height sufficient to clear components on said motherboard to said lower side of said daughter card.

13. An apparatus, for use with a data processing system having an architecture, which provides for the possibility of smart card use without unduly impacting the data processing system's architecture, said apparatus comprising:
an enclosure having at least one PC card acceptor, at least one smart card acceptor, at least one PC card acceptor device and at least one smart card acceptor device, said devices joined together in a space efficient manner and in a side-by-side fashion; and
a suspension mechanism, operably connected to said enclosure, said suspension mechanism capable of physically connecting said enclosure to a motherboard such that said enclosure is suspended above a component of said motherboard.

14. An apparatus, for use with a data processing system having an architecture, which provides for the possibility of smart card use without unduly impacting the data processing system's architecture, said apparatus comprising:
an enclosure having at least one PC card acceptor, at least one smart card acceptor, at least one PC card acceptor device and at least one smart card acceptor device, said devices joined together in a space efficient manner;
a suspension mechanism, operably connected to said enclosure, said suspension mechanism capable of physically connecting said enclosure to a motherboard such that said enclosure is suspended above a component of said motherboard;
a daughter card having an upper and a lower side;
said at least one PC card acceptor device joined to said upper side of said daughter card; and
said at least one smart card acceptor device joined to said lower side of said daughter card.

15. The apparatus of claim 14, wherein said suspension mechanism further comprises a connector, joined to said lower side of said daughter card, said connector being of height sufficient to clear components on said motherboard.

16. A method, for use with a data processing system having an architecture, which provides for the possibility of smart card use without unduly impacting the data processing system's architecture, said method comprising the steps of:
creating an enclosure, having at least one PC card acceptor, at least one smart card acceptor, including the step of joining together, in a space efficient manner and in a side-by-side fashion, at least one PC card acceptor device and at least one smart card acceptor device; and
operably connecting a suspension mechanism to said enclosure in a fashion such that said suspension mechanism is capable of physically connecting said enclosure to a motherboard such that said enclosure is suspended above a component of said motherboard.

17. A method, for use with a data processing system having an architecture, which provides for the possibility of smart card use without unduly impacting the data processing system's architecture, said method comprising the steps of:
creating an enclosure, having at least one PC card acceptor and at least one smart card acceptor, including the step of joining together, in a space efficient manner, at least one PC card acceptor device and at least one smart card acceptor device;
operably connecting a suspension mechanism to said enclosure in a fashion such that said suspension mechanism is capable of physically connecting said enclosure to a motherboard such that said enclosure is suspended above a component of said motherboard;

selecting a daughter card having an upper and a lower side;

joining said at least one PC card acceptor device to said upper side of said selected daughter card; and joining said at least one smart card acceptor device to said lower side of said selected daughter card.

18. The method of claim 17, wherein said step of operably connecting said suspension mechanism further comprises the step of joining a connector of height sufficient to clear components on said motherboard to said lower side of said daughter card.

* * * * *